United States Patent [19]

Crowe

[11] 4,269,386

[45] May 26, 1981

[54] VALVE ASSEMBLY

[75] Inventor: Donald R. Crowe, Mission Viejo, Calif.

[73] Assignee: Sargent Industries, Inc., Los Angeles, Calif.

[21] Appl. No.: 91,413

[22] Filed: Nov. 5, 1979

[51] Int. Cl.³ .................... F16K 31/56; B64D 25/14
[52] U.S. Cl. ........................................ 251/74; 74/2; 9/11 A; 9/319; 182/48; 193/25 B; 244/137 P
[58] Field of Search ............... 74/2; 137/223, 227; 193/25 B; 182/48; 244/137 P; 251/74, 75; 9/11 A, 14, 319, 11

[56] References Cited

U.S. PATENT DOCUMENTS

| 1,581,028 | 4/1926 | Sheaffer | 251/74 |
|---|---|---|---|
| 1,963,872 | 6/1934 | Sheaffer | 251/74 |
| 2,333,130 | 11/1943 | Thomsen | 74/2 |
| 2,733,042 | 1/1956 | Culbertson | 251/75 |
| 2,949,274 | 8/1960 | Heigis et al. | 251/74 |
| 3,165,763 | 1/1965 | Gaylord | 251/74 |
| 3,262,323 | 7/1966 | Fallis et al. | 74/2 |
| 3,598,215 | 8/1971 | Summer et al. | 244/137 P |
| 3,709,044 | 1/1973 | Chacko | 9/11 A |
| 3,782,413 | 1/1974 | Chacko | 251/74 |
| 3,973,744 | 8/1976 | Hintzman | 244/137 P |

FOREIGN PATENT DOCUMENTS 1538084  1/1979  United Kingdom ............... 244/137 P Primary Examiner—Martin P. Schwadron
Assistant Examiner—G. L. Walton
Attorney, Agent, or Firm—Charles H. Schwartz; Ellsworth R. Roston

[57] ABSTRACT

A valve assembly including a trigger mechanism for use in controlling the supply of a compressed gas to a gas activated device, including a valve body including an inlet port for connection to the supply of compressed gas and at least one outlet port for connection to the gas activated device and with an internal recess coupled to the inlet and outlet ports, a valve member located within the recess in the valve body and intermediate the inlet and outlet ports and with the valve member having a closed position providing for no path between the inlet and outlet ports and having an open position providing for a path between the inlet and outlet ports, a spring member coupled between the valve member and the valve body for providing a force for normally moving the valve member from the closed position to the open position, a trigger mechanism mounted on the valve body and including an armed position with the trigger mechanism locked and a fired position, and with the trigger mechanism coupled to the valve member and spring member and in the armed position when the valve member is in the closed position and in the fired position when the valve member is in the open position, and means coupled to the trigger mechanism for unlocking the trigger mechanism to have the trigger mechanism move from the armed position to the fired position to provide for the spring member moving the valve member from the closed position to the open position.

23 Claims, 8 Drawing Figures

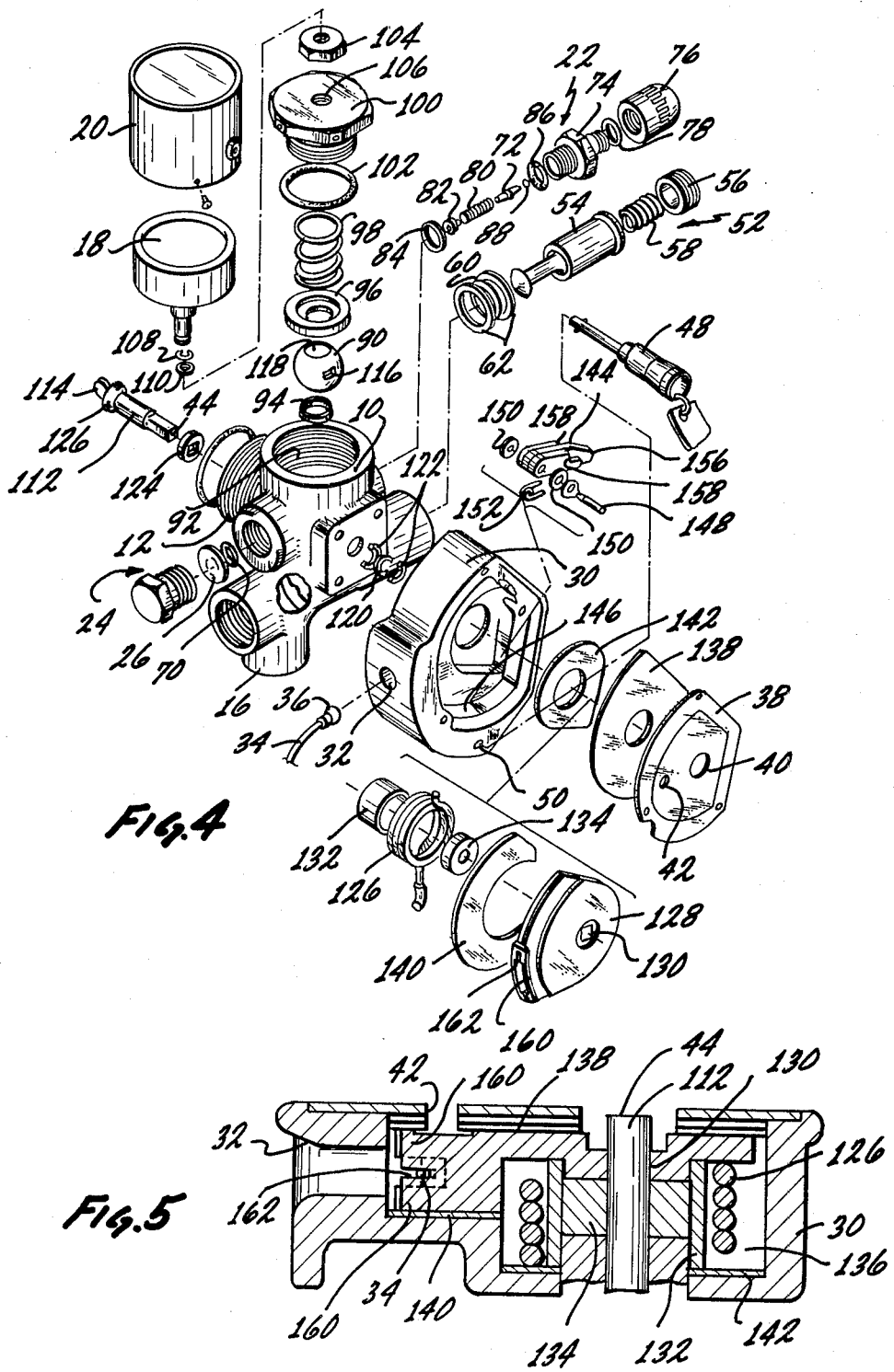

VALVE ASSEMBLY

The present invention relates to a valve assembly including a triggering mechanism for actuating the valve assembly from a closed position to an open position. Specifically the valve assembly of the present invention may be provided to operate emergency inflatable slides which are used in aircraft.

It is presently the practice to include with commercial aircraft an inflatable slide which is normally rolled up adjacent an emergency exit. During an emergency, when it is desired to have passengers quickly exit out of the aircraft, the slide may be unrolled through the emergency exit and inflated from a canister of compressed gas so as to provide for a continuous slide to convey passengers from the aircraft to the ground. Intermediate the canister of compressed gas and the inflatable slide is a valve assembly which must be properly actuated so as to allow the compressed gas to fill the inflatable slide for providing a proper sliding surface for use by the passengers in an emergency.

In the prior art, the valve assemblies are normally actuated by a cable having one end attached to the valve assembly and the other end attached to the slide. When the slide is unrolled through the emergency door, the cable is pulled so as to provide actuation of the valve from a closed to an open door position. Normally in the prior art, the force for actuating the valve has to be through the entire distance necessary to actuate the valve from the closed to the open position so as to ensure that the valve is fully open. As the slide is unrolled, the initial force provided by the slide to pull the cable is at its greatest in the initial position since the slide is fully rolled up. However, as the slide continues to unroll the pulling force on the cable decreases and with smaller slides there may not be sufficient force so as to automatically actuate the valve to the fully open position. If the valve is not actuated to the fully opened position, there may not be a sufficient amount of gas in the slide or the slide may not be fully deployed.

The present invention overcomes the problems of the prior art by using a valve assembly including a trigger mechanism and with the trigger mechanism including a coiled spring which supplies force to actuate the valve when the trigger mechanism is pulled past a predetermined point. The trigger mechanism actually includes a sear such as in a gun and with the coiled spring automatically uncoiling to open the valve once the sear is unlocked from a cocked position. The present invention therefore provides for a valve, such as a ball valve, with a trigger mechanism and including a spring to operate the valve so as to ensure that the full amount of compressed gas is provided to an inflatable slide once the trigger is pulled through a relatively small degree of travel. For example, in a specific embodiment of a valve mechanism of the present invention, a ¼ inch cable pull is sufficient to actuate the trigger mechanism and to thereby rotate the ball assembly 90° from the fully closed to the fully open position. The use of the spring to produce the actuation of the valve provides for a valve assembly which is more fail-safe than the prior art since the spring itself does the pulling once the sear has been unlocked and the spring is triggered.

The present invention uses a helical spring and with the spring positioned so that even if the spring becomes corroded the valve assembly may be still operated by pulling the cable. The trigger mechanism and specifically the sear mechanism, is designed to be over center so that the valve is either on or is off and cannot be held in an intermediate position. If, for example, the trigger is not pulled through a sufficient distance the mechanism goes back to the original off position. This prevents accidental triggering and partial release of compressed gas when not desired. Also the type of force necessary to actuate the valve is more tailored to the type of force that the slide provides. As indicated above the deploying of the slide initially provides for a large force which decreases and this is the same type of force necessary to actuate the triggering mechanism of the present invention.

The present invention also includes additional safety features such as the use of a safety pin to prevent an accidental actuation during shipping and handling. Another pin may be used so as to disarm the trigger mechanism if the trigger mechanism has been armed prior to a time when the arming is desirable. For example, the trigger mechanism may be armed without installing the cable. It is therefore possible to disarm the trigger mechanism and then install the cable in the proper way.

A clearer understanding of the present invention will be had with reference to the following descriptions and drawings wherein FIG. 1 illustrates an external perspective view of the valve assembly and trigger mechanism of the present invention;

FIG. 4 is an exploded perspective view of the valve assembly and trigger mechanism of the present invention;

FIG. 5 is a detail cross-sectional view taken along lines 5—5 of FIG. 1 showing the helical spring in association with other portions of the trigger mechanism;

Figure 1:
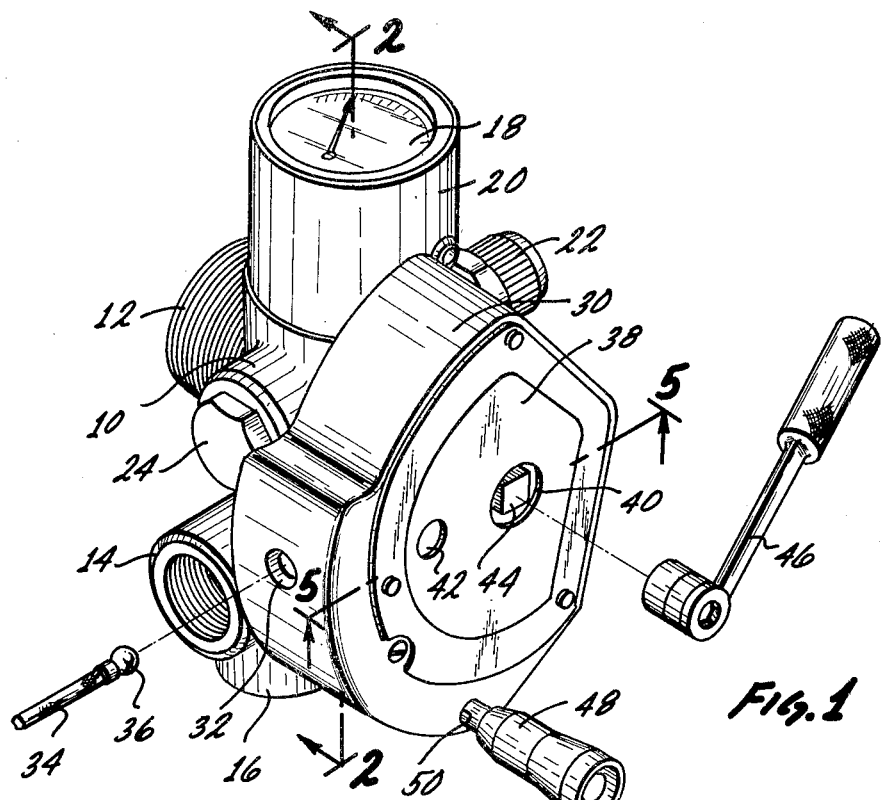

In FIG. 1 an overall perspective view of the valve assembly and trigger mechanism of the present invention is shown. A main valve body 10 receives and supports the various components forming the complete valve assembly. An inlet port 12 receives pressurized gas from a source (not shown) such as a canister of pressurized air. However, it is to be appreciated that the pressurized gas may be other gases such as nitrogen, or mixtures of nitrogen and air and other gases such as carbon dioxide. Outlet ports 14 and 16 are located 90° from each other and may be used to supply the compressed gas when desired in a particular direction to an inflatable slide (not shown). Either or both of the ports may be used and if a port is not used it may be closed off by a plug.

A pressure gauge 18 monitors the pressure of the stored gas and provides for a constant check that the stored gas is at the proper pressure so as to provide for an inflation of the slide when desired. A gauge guard 20 surrounds the pressure gauge for protective purposes. A fill valve assembly 22 is essentially a one way valve so as to provide for the gas to pass through the fill valve assembly 22 and out the inlet port 12 to the gas cylinder. The fill valve assembly 22 however, prevents for the passage of gas out of the fill valve assembly 22.

A burst disc assembly 24 acts as a pressure release relief device so as to provide protection for the valve assembly and also for the cylinder which stores the gas in the event that the gas pressure exceeds a predetermined level. For example, as shown in FIG. 2 the burst disc assembly 24 includes a burstable diaphragm 26 to release the pressure to the atmosphere through the opening 28.

A trigger mechanism is enclosed within housing 30 and is mounted to the valve body 10. An opening 32 in the trigger mechanism housing 30 allows access to the interior of the trigger mechanism for firing. Specifically, a firing cable 34 having a ball 36 at its end is inserted into the trigger mechanism through the opening 32 in the housing 30.

A plate 38 covers one face of the housing 30 to enclose the trigger mechanism and to secure the various members. The plate 38 includes openings 40 and 42 to provide access to the interior of the housing 30. Specifically an end portion 44 of a valve stem forms an arming shaft which may be actuated by an arming tool 46. The opening 42 is a window to provide for a visible indication of whether the valve is either in an armed condition or a fired condition. For example, the opening may show one color such as white to indicate that the valve has been armed, and another color such as red to indicate that the valve has been fired. In order to ensure that when the valve is armed it is not inadvertently fired, a safety pin 48 may be inserted through a safety opening 50 to prevent firing of the valve until the pin is removed. For example, the pin may be inserted into the trigger mechanism through the opening 50 and prior to the flight the pin may be removed.

Figure 2:
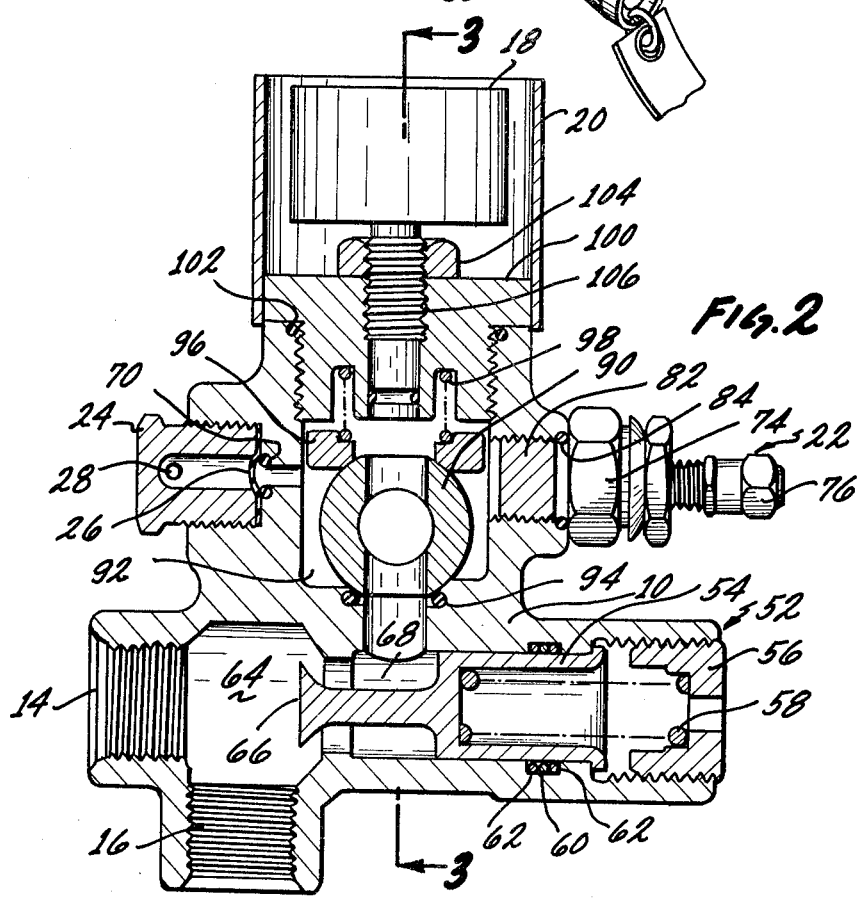
FIG. 2 is a cross-sectional view of the valve assembly taken along lines 2—2 of FIG. 1.
Figure 3:
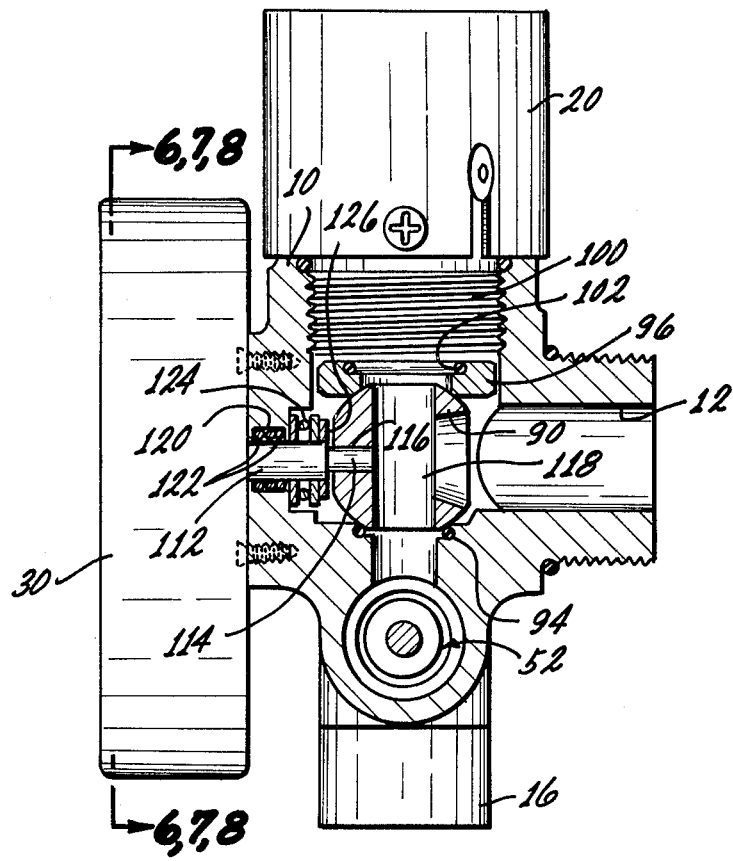
FIG. 3 is a further cross-sectional view of the valve assembly taken along line 3—3 of FIG. 2.

FIGS. 2, 3 and 4 illustrate further details of of the valve assembly and trigger mechanism of the present invention. The valve assembly further includes a valve regulator assembly 52 which provides for a regulation of the pressure from the source of the compressed gas to the inflatable slide. This ensures that the supply of stored gas is supplied to the inflatable slide at a controlled pressure. The regulator assembly includes a regulating poppet 54 which is held in position within the valve body by a regulating screw 56. The regulating screw 56 presses against a regulating spring 58 which spring is located within a recess in the poppet 54. An O-ring seal including an O-ring 60 located between a pair of split rings 62 provides for sealing between the valve body and the regulating poppet 54.

The regulator valve assembly 52 operates in accordance with the back pressure induced in the valve assembly during operation of the valve. For example, as the gas flow is released through the valve to an outlet chamber 64 in the valve body and then on to the inflatable slide, any back pressure downstream causes the pressure to build up in the chamber 64. This back pressure would act on the front face 66 of the regulating poppet to overcome the force of the regulating spring 58. The poppet would therefore throttle down so as to partially close an inlet chamber 68. This condition occurs until a balance condition is established to ensure the proper flow of gas to the inflatable slide.

The burst disc pressure release relief portion includes an O-ring 70 to ensure sealing between the end of the plug member and the burstable disc 26. The fill valve assembly 22 is formed by a number of components. Specifically a poppet valve 72 is held in position between the valve body 10 and a fill valve housing 74. The fill valve housing 74 threads into the valve body at one side and has a second threaded portion extending from the other side. This allows for the fill valve assembly to be capped off using a cap 76 which is sealed with an O-ring 78.

When it is desired to use the fill valve the cap is unthreaded and the source of gas may now be supplied through the fill valve assembly and out the inlet port 12 to the gas canister which is located in the aircraft. The fill valve assembly 22 is normally held in a closed position to prevent any leakage of gas by the poppet valve 72. A spring member 80 normally urges the poppet valve 72 in the closed direction. The spring member is held in position by a retainer 82. O-rings 84, 86 and 88 provide for the proper sealing of the various members in the fill valve assembly 22.

The main valve in the valve assembly of the present invention is provided by a ball valve 90 which is seated within an opening 92 in the valve body 10. The ball valve 90 is sealed at its lower end within the opening 92 through the use of an O-ring 94. The upper end of the ball valve 90 is seated within guide member 96. The guide member 96 is held in position by a helical spring 98 and the whole assembly 18 is locked in position with a threaded plug member 100. The threaded plug member is sealed using an O-ring 102. It can be seen that the helical spring 98 is captured between the guide 96 and the plug 100 and provides for a force to retain the ball valve 90 securely in position while allowing for rotation of the ball valve 90. The pressure gauge 18 is mounted on top of and through the plug member 100 through the use of a nut member 104 and a threaded opening 106 in the plug member. A split ring 108 and an O-ring 110 provide for the proper sealing of the pressure gauge 18 so as to have the pressure gauge 18 monitor the pressure provided by the source of compressed gas.

The rotation of the ball valve 90 is controlled by a valve stem 112 which includes a rectangular tang portion 114 which fits within a corresponding rectangular opening 116 in the ball valve 90. The ball valve 90 also includes a T-shaped channel 118 to direct the source of compressed gas from the inlet port 12 to either of the outlet ports 14 or 16 upon actuation of the ball valve. The ball valve 90 is of course moved between the open and closed positions by rotating the valve stem 112. As shown in FIG. 1 the square end portion 44 of the valve stem 112 is visible through the opening 40 in the plate 38 to allow the valve to be moved to the closed position when the trigger mechanism is armed. The valve stem 112 is sealed within the valve body through the use of an O-ring 120 captured between split rings 122. In addition, a thrust bearing 124, which is retained between an enlarged portion 126 of the valve stem 112 and a recessed portion of the valve body 10, provides for support and for ease of rotation of the valve stem during actuation of the ball valve 90.

The trigger mechanism is situated within the trigger housing 30 and provides for the actuation of the ball valve 90 by directly applying a rotational force to the valve stem 112. Specifically, the trigger mechanism includes a helical spring 126 which is connected at one end to the housing 30 and at the other end to a sector member 128. The sector member 128 includes a square opening 130 which receives the square end 44 of the valve stem 112. Therefore any rotational movement of the sector 128 produces rotational movement of the ball valve 90.

A pair of spacer members 132 and 134 properly position and support the helical spring 126 within a recess 136 in the trigger housing 30. This may be more clearly seen with reference to FIG. 5. The sector member 128 is supported for rotation between upper and lower thrust-bearing members 138 and 140. A spring washer 142 provides for the proper pressure to maintain the above components in proper spatial relationship.

Figure 6:
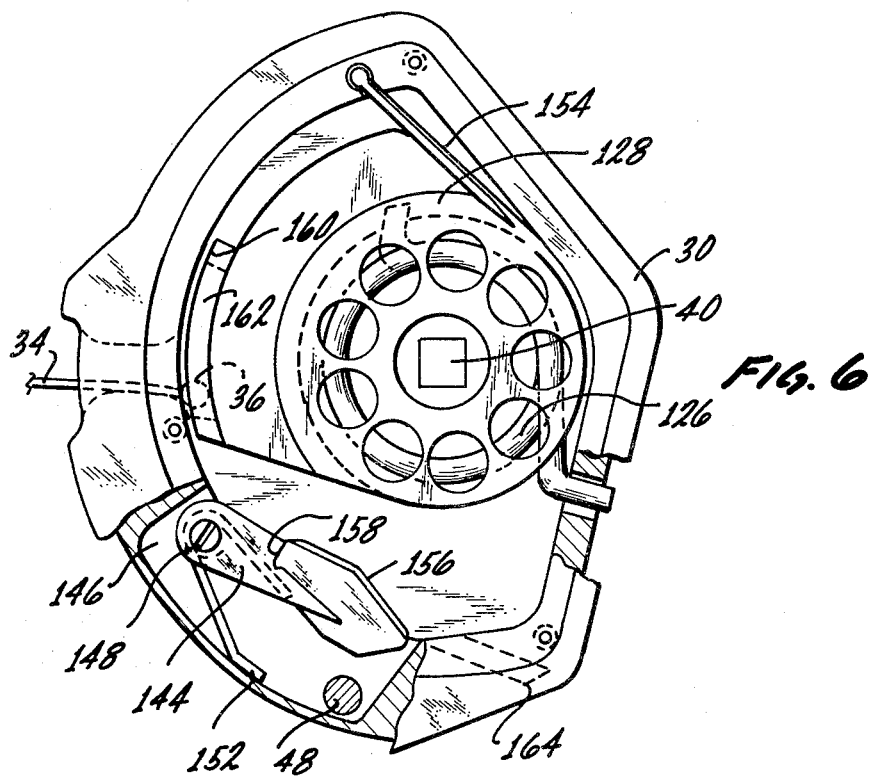
FIG. 6 illustrates the trigger mechanism in an open position showing the trigger mechanism either just prior to arming or after actuation so as to provide for the passage of compressed gas through the valve.

The trigger mechanism also includes a trigger sear 144. The sear is mounted for off-center rotation within a recess 146 in the trigger housing 30. The sear is rotationally mounted on a dowel member 148 and with a pair of thrust washers 150 located on either side of the sear. A sear spring member 152 has a first end portion pressing against the wall of the recess 146 and a second end portion pressing against the sear 144. A sector snubber 154 is located within a groove in the housing 30 and acts as a flexible stop to prevent rotation of the sector past a certain point in a clockwise direction of rotation. For example, as shown in FIG. 6 the sector 128 has been rotated in the clockwise direction and with a portion of the sector 128 against the snubber 154. The sector 128 can be rotated a small amount more against the snubber 154 to allow the insertion of the cable 34 and ball end portion 36.

Figure 8:
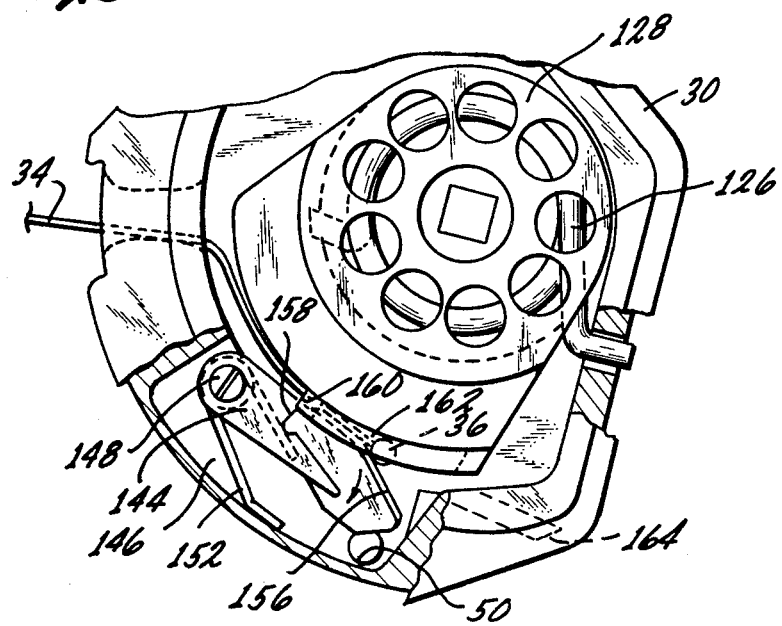
FIG. 8 illustrates the trigger mechanism in a position just prior to firing and with a further pulling of the cable firing the trigger mechanism and opening the valve.

As can be seen in FIG. 4 the sear has an elongated center portion 156 with a sloping front edge and two stepped portions 158 each having a locking face. This can also be seen in FIGS. 6, 7 and 8. In addition, the sector member 128 includes a stepped portion 160 having a locking face and with the stepped portion 160 including a groove 162 to receive the elongated center portion 156 of the sear. The groove 162 has an enlarged center portion so as to receive and capture the ball portion 36 at the end of the release cable 34.

FIG. 6 illustrates the trigger mechanism in the unarmed state and with the release cable 34 partially inserted through the opening 32 and within the groove 162 and with the ball 36 portion lying within the enlarged center portion of the groove 162. The sector member 128 may not be rotated counterclockwise using the arming tool 46 shown in FIG. 1. As the sector is rotated counterclockwise this compresses the helical spring 126. Also the ball portion 36 and cable are moved along and with the sector member eventually engaging the sear 144. The outer surface of the stepped portion 160 then engages the outer surface of the stepped portions 158 of the sear and thereby provides for clockwise rotation of the sear.

Figure 7:
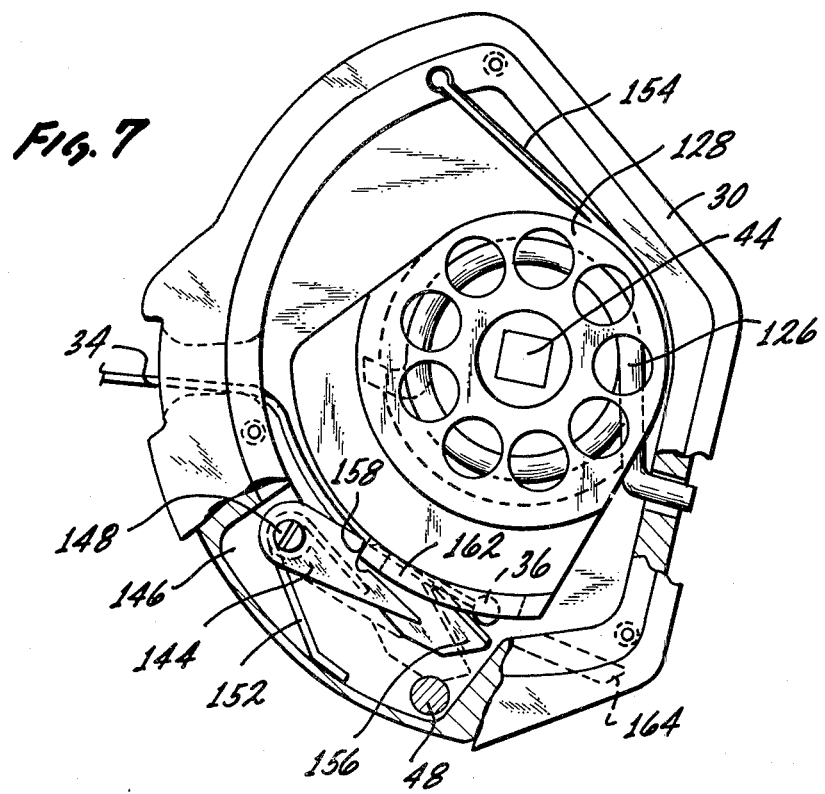
FIG. 7 shows the trigger mechanism in a cocked position awaiting actuation and with the valve closed to prevent passage of gas through the valve.

Further rotation of the sector 128 allows for the stepped portion 162 of the sector 160 to override the stepped portion 158 of the sear 144 to have the two locking faces located against each other as shown in FIG. 7. When the locking faces lock the sear is rotated counterclockwise back to the position shown in FIG. 7. The portion 156 of the sear tends to push the ball 36 forward so that when the locking faces lock, the ball portion 36 is located within a groove 162.

When the sector 126 has been fully rotated in a counterclockwise direction, the helical spring 126 is now in compression and is storing energy to provide for the actuation of the ball valve 90 when the trigger mechanism is fired. As a safety feature the pin member 48 may be inserted to be in the position as shown in FIG. 7. The pin member 48 prevents the firing of the trigger mechanism since the pin member allows the sear to rotate only to the dotted position shown in FIG. 7. In this dotted position the locking face of the stepped portions 158 and 160 are still locked and cannot provide for a release of the trigger mechanism.

When the pin 48 is removed and the mechanism is armed as shown in FIG. 7, the trigger mechanism is now cocked and ready for firing. When the cable 34 is pulled the ball 36 now rides within the enlarged portion of the groove 162 and against the sloping portion of the section 156 of the sear. The pressure against the sear provides for clockwise rotation of the sear to compress the spring 152. When the clockwise rotation of the sear 144 is sufficient the locking faces of two portions 158 and 160 are released and the section member 128 may now freely rotate in a clockwise direction under impetus from the helical spring 126.

The force required to fire the trigger mechanism is at its greatest in the beginning of pull of the cable 34 and the force is then substantially diminished as the helical spring provides for the continued rotation of the sector. If the helical spring 126 is corroded, the sector member 128 may still be rotated and pulled through to the valve open position using the cable 34 with its ball end 36. This is possible since the end of the helical spring 126 attached to the sector is at an acute angle to allow the end of the spring to be released and thereby allow the sector member 128 to continue to rotate in a clockwise direction.

In the fully open position for the valve the trigger mechanism would be in the position shown in FIG. 6. It is therefore necessary to arm the valve to the position shown in FIG. 7 so as to have the proper relationship of the ball valve 90 within the valve assembly prior to filling the gas canister. Alternatively, the gas canister can be filled before attaching to the inlet port but this would require an additional hand operated valve for the canister. If the trigger mechanism is inadvertently cocked without installing the firing pin, the trigger may be fired by inserting a pin through an opening 164 to engage the sear 144.

The present invention therefore provides for a trigger mechanism including a spring actuated trigger and with a sear arrangement to maintain the trigger mechanism in the armed position and with the force required to fire the trigger mechanism tailored to the same type of force provided by the automatic deployment of the slide. Once the mechanism is triggered, a helical spring provides for the actual rotation of the valve member to allow for the supply of gas to the safety slide. The actual amount of cable which must be pulled in order to fire the trigger mechanism is relatively small and in a specific example a two-inch travel of the cable will fire the trigger mechanism and thereby rotate the ball valve through 90° from a fully closed to a fully open position.

Although the present invention has been described with reference to a particular embodiment, it is to be appreciated that the various adaptations and modifications may be made and the invention is only to be limited by the apended claims.

I claim:

1. A valve assembly including a trigger mechanism for use in controlling the supply of a compressed gas to a gas activated device, including
    a valve body including an inlet port for connection to the supply of compressed gas and at least one outlet port for connection to the gas activated device and with an internal recess coupled to the inlet and outlet ports, a valve member located within the recess in the valve body and intermediate the inlet and outlet ports and with the valve member having a closed position providing for no path between the inlet and outlet ports and having an open position providing for a path between the inlet and outlet ports, a spring member coupled between the valve member and the valve body for providing a force for normally moving the valve member from the closed position to the open position, a trigger mechanism mounted on the valve body and including an armed position with the trigger mechanism locked and a fired position, and with the trigger mechanism coupled to the valve member and spring member and in the armed position when the valve member is in the closed position and in the fired position when the valve member is in the open position, the trigger mechanism including a rotatably mounted sector member intercoupling the spring member and the valve member, the spring member formed as a helix having a first end coupled to the valve body and a second end coupled to the sector member and wherein one of the coupled ends of the helix is at an angular relationship and is loosely received in an opening for allowing the one end to disengage the opening when the turns of the helix do not freely move relative to each other, and means coupled to the trigger mechanism for unlocking the trigger mechanism to have the trigger mechanism move from the armed position to the fired position to provide for the spring member moving the valve member from the closed position to the open position.

2. The valve assembly of claim 1 wherein the valve member is a rotatable ball member and providing for the closed and open positions in accordance with a rotation of the rotatable ball member.

3. The valve assembly of claim 2 additionally including a valve stem interconnecting the rotatable ball member and the trigger mechanism for interconnected movement of the ball member and trigger mechanism and with an end portion of the valve stem accessible for moving the trigger mechanism to the armed position.

4. The valve assembly of claim 1 wherein the means for unlocking the trigger mechanism includes a cable having a ball member at the end of the cable and with movement of the ball member in a particular direction providing unlocking of the trigger mechanism.

5. The valve assembly of claim 1 additionally including a safety pin for insertion into the trigger mechanism at a particular location for preventing accidental unlocking of the trigger mechanism.

6. The valve assembly of claim 1 wherein the trigger mechanism includes a rotatably mounted sear member and a sear spring biasing the sear member in a particular direction of rotation and with the rotatably mounted sector member coupled to the spring member and the valve member and with the sear member and sector member each including oppositely disposed locking faces lying against each other for locking the trigger mechanism in the armed position.

7. The valve assembly of claim 6 wherein the sear member is formed with an elongated unlocking portion having a sloped face and a stepped portion including the locking face and wherein the sector member is formed with a stepped portion including the locking face and with the means for unlocking the trigger mechanism acting between the sloped face and the stepped portion of the sector member for unlocking the locking faces.

8. The valve assembly of claim 7 wherein the means for unlocking the trigger mechanism includes a cable having a ball member at the end of the cable larger in diameter than the diameter of the cable and with the stepped portion of the sector member including a groove having a first portion larger in width than the diameter of the cable but smaller than the diameter of the ball member and a second center portion larger in width than the diameter of the ball member to have the cable pass through the first portion of the groove while the ball member sits within the second portion of the groove and with the elongated unlocking portion having a thickness less than the width of the groove to have the elongated locking portion sit within the groove when the locking faces are lying against each other.

9. The valve assembly of claim 7 wherein the sear spring rotatably biases the sear member in the direction for maintaining the locking faces in engagement for preventing accidental unlocking of the trigger mechanism.

10. The valve assembly of claim 7 additionally including a safety pin for insertion into the trigger mechanism to interrupt the rotational path of the sear member for preventing accidental unlocking of the trigger mechanism.

11. A valve assembly for use in controlling the supply of a compressed gas to a gas activated device, including, an inlet port for connection to the supply of compressed gas and at least one outlet port for connection to the gas activated device and with an intermediate chamber coupled to the inlet and outlet ports, a rotatable valve member including a pathway located within the chamber and with the valve member rotatable between a closed position wherein the pathway does not provide for a path between the inlet and outlet ports and an open position wherein the pathway does provide for a path between the inlet and outlet ports, a rotatable valve stem coupled to the valve member for providing rotation of the valve member upon rotation of the valve stem, a rotatable sector member including a locking portion coupled to the valve stem for providing concurrent rotation of the valve stem and the sector member, a spring member coupled between the sector member and a fixed anchor point for providing a force for normally moving the valve member through the sector member and valve stem from the closed position to the open position, the spring member formed as a helix having a first end fixed to the anchor point and a second end coupled to the sector member and with the second end of the helix at an angular relationship and loosely received in an opening in the sector member for allowing the second end of disengage from the opening when the turns of the helix do not freely move relative to each other, a sear member including a locking portion and with the sector member including an armed position with the locking portions interlocked and a fired position with the locking portions unlocked and with the armed position corresponding to the valve member in the closed position and with the fired position corresponding to the valve member in the open position, and means coupled to the sector member and the sear member for unlocking the locking portions to have the sector member move from the armed position to the fired position to provide for the spring member moving the valve member from the closed position to the open position.

12. The valve assembly of claim 11 wherein the rotatable valve member is a ball member and providing for the closed and open positions in accordance with a rotation of the ball member.

13. The valve assembly of claim 11 wherein an end portion of the valve stem is accessible for moving the sector member to the armed position.

14. The valve assembly of claim 11 wherein the means for unlocking the locking portions includes a cable having a ball member at the end of the cable with the movement of the ball member in a particular direction providing unlocking of the locking portions.

15. The valve assembly of claim 11 additionally including a safety pin for insertion at a particular location for preventing accidental unlocking of the locking portions.

16. The valve assembly of claim 11 wherein the sear member is rotatably mounted and including a sear spring biasing the sear member in a particular direction of rotating for maintaining the locking portions in engagement for preventing accidental unlocking.

17. The valve assembly of claim 11 wherein the sear member is formed with an elongated unlocking portion having a sloped face and a stepped portion including the locking portion formed as a locking face and wherein the sector member is formed with a stepped portion including the locking portion formed as a locking face and with the means for unlocking the locking portions acting between the sloped face and the stepped portion of the sector member for unlocking the locking faces.

18. The valve assembly of claim 17 wherein the means for unlocking the locking portions includes a cable having a ball member at the end of the cable larger in diameter than the diameter of the cable and with the stepped portion of the sector member including a groove having a first portion larger in width than the diameter of the cable but smaller than the diameter of the ball member and a second center portion larger in width than the diameter of the ball member to have the cable pass through the first portion of the groove while the ball member sits within the second portion of the groove and with the elongated unlocking portion having a thickness less than the width of the groove to have the elongated locking portion sit within the groove when the locking faces are lying against each other.

19. The valve assembly of claim 17 additionally including a safety pin for insertion to interrupt the rotational path of the elongated portion of the sear member for preventing accidental unlocking of the trigger mechanism.

20. A valve assembly including a trigger mechanism for use in controlling the supply of a compressed gas to a gas activated device, including a valve body including an inlet port for connection to the supply of compressed gas and at least one outlet port for connection to the gas activated device and with an internal recess coupled to the inlet and outlet ports, a valve member located within the recess in the valve body and intermediate the inlet and outlet ports and with the valve member having a closed position providing for no path between the inlet and outlet ports and having an open position providing for a path between the inlet and outlet ports, a spring member coupled between the valve member and the valve body for providing a force for normally moving the valve member from the closed position to the open position, a trigger mechanism mounted on the valve body and including an armed position with the trigger mechanism locked and a fired position, and with the trigger mechanism coupled to the valve member and spring member and in the armed position when the valve member is in the closed position and in the fired position when the valve member is in the open position, the trigger mechanism including a rotatably mounted sear member and a sear spring biasing the sear member in a particular direction of rotation and a rotatably mounted sector member coupled to the spring member and the valve member and with the sear member and sector member each including oppositely disposed locking faces lying against each other for locking the trigger mechanism in the armed position, the sear member formed with an elongated unlocking portion having a sloped face and stepped portion including the locking face and wherein the sector member is formed with a stepped portion including the locking face and with the means for unlocking the trigger mechanism acting between the sloped face and the stepped portion of the sector member for unlocking the locking faces, means coupled to the trigger mechanism for unlocking the trigger mechanism to have the trigger mechanism move from the armed position to the fired position to provide for the spring member moving the valve member from the closed position to the open position, and the means for unlocking the trigger mechanism including a cable having a ball member at the end of the cable larger in diameter than the diameter of the cable and with the stepped portion of the sector member including a groove having a first portion larger in width than the diameter of the cable but smaller than the diameter of the ball member and a second center portion larger in width than the diameter of the ball member to have the cable pass through the first portion of the groove while the ball member sits within the second portion of the groove and with the elongated unlocking portion having a thickness less than the width of the groove to have the elongated locking portion sit within the groove when the locking faces are lying against each other.

21. A valve assembly including a trigger mechanism for use in controlling the supply of a compressed gas to a gas activated device, including a valve body including an inlet port for connection to the supply of compressed gas and at least one outlet port for connection to the gas activated device and with an internal recess coupled to the inlet and outlet ports, a valve member located within the recess in the valve body and intermediate the inlet and outlet ports and with the valve member having a closed position providing for no path between the inlet and outlet ports and having an open position providing for a path between the inlet and outlet ports, a spring member coupled between the valve member and the valve body for providing a force for normally moving the valve member from the closed position to the open position, a trigger mechanism mounted on the valve body and including an armed position with the trigger mechanism locked and a fired position, and with the trigger mechanism coupled to the valve member and spring member and in the armed position when the valve member is in the closed position and in the fired position when the valve member is in the open position, the trigger mechanism includes a rotatably mounted sear member and a sear spring biasing the sear member in a particular direction of rotation and a rotatably mounted sector member coupled to the spring member and the valve member and with the sear member and sector member each including oppositely disposed locking faces lying against each other for locking the trigger mechanism in the armed position, the sear member formed with an elongated unlocking portion having a sloped face and a stepped portion including the locking face and wherein the sector member is formed with a stepped portion including the locking face and with the means for unlocking the trigger mechanism acting between the sloped face and the stepped portion of the sector member for unlocking the locking faces, the sear spring rotatably biasing the sear member in the direction for maintaining the locking faces in engagement for preventing accidental unlocking of the trigger mechanism, and means coupled to the trigger mechanism for unlocking the trigger mechanism to have the trigger mechanism move from the armed position to the fired position to provide for the spring member moving the valve member from the closed position to the open position.

22. A valve assembly including a trigger mechanism for use in controlling the supply of a compressed gas to a gas activated device, including
a valve body including an inlet port for connection to the supply of compressed gas and at least one outlet port for connection to the gas activated device and with an internal recess coupled to the inlet and outlet ports, a valve member located within the recess in the valve body and intermediate the inlet and outlet ports and with the valve member having a closed position providing for no path between the inlet and outlet ports and having an open position providing for a path between the inlet and outlet ports, a spring member coupled between the valve member and the valve body for providing a force for normally moving the valve member from the closed position to the open position, a trigger mechanism mounted on the valve body and including an armed position with the trigger mechanism locked and a fired position, and with the trigger mechanism coupled to the valve member and spring member and in the armed position when the valve member is in the closed position and in the fired position when the valve member is in the open position, the trigger mechanism including a rotatably mounted sear member and a sear spring biasing the sear member in a particular direction of rotation and a rotatably mounted sector member coupled to the spring member and the valve member and with the sear member and sector member each including oppositely disposed locking faces lying against each other for locking the trigger mechanism in the armed position, the sear member formed with an elongated unlocking portion having a sloped face and a stepped portion including the locking face and wherein the sector member is formed with a stepped portion including the locking face and with the means for unlocking the trigger mechanism acting between the sloped face and the stepped portion of the sector member for unlocking the locking faces, means coupled to the trigger mechanism for unlocking the trigger mechanism to have the trigger mechanism move from the armed position to the fired position to provide for the spring member moving the valve member from the closed position to the open position, and a safety pin for insertion into the trigger mechanism to interrupt the rotational path of the sear member for preventing accidental unlocking of the trigger mechanism.

23. A valve assembly for use in controlling the supply of a compressed gas to a gas activated device, including,
an inlet port for connection to the supply of compressed gas and at least one outlet port for connection to the gas activated device and with an intermediate chamber coupled to the inlet and outlet ports, a rotatable valve member including a pathway located within the chamber and with the valve member rotatable between a closed position wherein the pathway does not provide for a path between the inlet and outlet ports and an open position wherein the pathway does provide for a path between the inlet and outlet ports, a rotatable valve stem coupled to the valve member for providing rotation of the valve member upon rotation of the valve stem, a rotatable sector member including a locking portion coupled to the valve stem for providing concurrent rotation of the valve stem and the sector member, a spring member coupled between the sector member and a fixed anchor point for providing a force for normally moving the valve member through the sector member and valve stem from the closed position to the open position, a sear member including a locking portion and with the sector member including an armed position with the locking portions interlocked and a fired position with the locking portions unlocked and with the armed position corresponding to the valve member in the closed position and with the fired position corresponding to the valve member in the open position, means coupled to the sector member and the sear member for unlocking the locking portions to have the sector member move from the armed position to the fired position to provide for the spring member moving the valve member from the closed position to the open position, the sear member formed with an elongated unlocking portion having a sloped face and a stepped portion including the locking portion formed as a locking face and wherein the sector member is formed with a stepped portion including the locking portion formed as a locking face and with the means for unlocking the locking portions acting between the sloped face and the stepped portion of the sector member for unlocking the locking faces, and the means for unlocking the locking portions including a cable having a ball member at the end of the cable larger in diameter than the diameter of the cable and with the stepped portion of the sector member including a groove having a first portion larger in width than the diameter of the cable but smaller than the diameter of the ball member and a second center portion larger in width than the diameter of the ball member to have the cable pass through the first portion of the groove while the ball member sits within the second portion of the groove and with the elongated unlocking portion having a thickness less than the width of the groove to have the elongated locking portion sit within the groove when the locking faces are lying against each other.

* * * * *